United States Patent [19]

Geary

[11] Patent Number: 4,917,498

[45] Date of Patent: Apr. 17, 1990

[54] ARRANGEMENT FOR TESTING GRAZING HYPERBOLOIDS AND SIMILAR REFLECTIVE SOLID BODIES FOR SHAPE DEVIATIONS

[76] Inventor: Joseph M. Geary, 10660 Pinewood Trail, Jupiter, Fla. 33478

[21] Appl. No.: 313,288

[22] Filed: Feb. 17, 1989

Related U.S. Application Data

[63] Continuation of Ser. No. 61,637, Jun. 15, 1987, abandoned.

[51] Int. Cl.$^4$ ............................................... G01B 9/02
[52] U.S. Cl. .................................... 356/357; 356/360
[58] Field of Search ....................... 356/345, 357, 360; 358/106

[56] References Cited

PUBLICATIONS

"Direct Measurements of Phase in a Spherical-Wave F12 Gau Interferometer", Moore et al., Applied Optics, 7-1980, pp. 2196-2200.

"Precise Optical Evaluation Using Phase Measuring Interferometric Techniques", Grosso et al., SPIE, 1979, pp. 65-74.

"A New Approach to High Precision Phase Measurement Interferometry", Balasubramanian et al., SPIE, 1980, pp. 180-190.

Primary Examiner—Vincent P. McGraw
Assistant Examiner—S. A. Turner

[57] ABSTRACT

An arrangement for testing a reflecting surface of a solid body, especially a relatively complex reflecting surface such as that of a grazing hyperboloid, for deviations of its actual shape from its ideal shape includes a laser source and a positive cylindrical lens interposed between the laser source and the reflecting surface to be tested. The lens optically modifies the laser beam in such a manner as to propagate between the lens and the reflecting surface substantially normal to the reflecting surface and to be reflected from the latter for propagation back to and through the lens toward the laser source as a return laser beam having a wave front indicative of the actual shape of the reflecting surface and any aberrations of the lens. The arrangement further includes an interferometer that forms an interference pattern between the original and return laser beams, and a circuitry for evaluating the interference pattern. The evaluating circuitry subtracts first and second reference signals respectively representative of the ideal shape of the reflecting surface and of the influence of the lens aberrations on the interference pattern from an initial signal representative of the sensed interference pattern.

10 Claims, 2 Drawing Sheets

ARRANGEMENT FOR TESTING GRAZING HYPERBOLOIDS AND SIMILAR REFLECTIVE SOLID BODIES FOR SHAPE DEVIATIONS

This application is a continuation of application Ser. No. 061,637, filed June 15, 1987, and now abandoned.

DESCRIPTION

1. Technical Field

The present invention relates generally to testing reflective solid bodies, and more particularly to testing grazing hyperboloids and similar reflective solid bodies for deviations of the actual shapes of their reflecting surfaces from their ideal shapes.

2. Background Art

There are already known various methods of and arrangements for testing optical reflecting surfaces for shape accuracy, among them such utilizing interferometric evaluation of a laser beam which has been reflected from the reflecting surface being tested. The heretofore known methods and arrangements become more and more complex as the complexity of the shape of the reflecting surface to be tested increases. So, for instance, it is extremely difficult to obtain reliable metrological measurements with respect to grazing hyperboloids that are to be employed, for instance, in free electron laser resonators and the reflecting surface of each of which is to be impinged upon during its use by a light beam at a grazing angle of incidence deviating from normal to the reflecting surface.

A technique which is currently being used most frequently for testing the reflecting surface of a grazing hyperboloid is to direct a laser beam through a negative lens against the reflecting surface at the grazing incidence, whereupon the laser beam reflected from the reflecting surface propagates toward a concave part-spherical reflective reference surface to be reflected therefrom back to the reflecting surface being tested and from there back through the negative lens toward the laser beam source at which the returning beam is interfered in a Fizeau-type interferometer with the original laser beam and the resulting interferogram is then evaluated in order to determine the extent and distribution of any deviations of the actual shape of the surface being tested from its ideal or desired shape.

Aside from alignment issues and system component errors, one important problem which severely limits the usefulness of this technique is that it can hardly be used, if at all, in the context of fabricating grazing hyperboloids and particularly their reflecting surfaces. This is so because great difficulties are encountered in localizing surface configuration errors when testing at grazing incidence because of the considerable and varying foreshortening occurring under these testing conditions. Consequently, opticians or other personnel attempting to correct the configuration errors will be severely hampered in their efforts to bring the tested surface into its desired form, and there is a pronounced danger that such personnel will take erroneous corrective actions because of incorrect evaluation or interpretation of the interferogram due to the effects of the aforementioned foreshortening.

Accordingly, it is a general object of the present invention to avoid the disadvantages of the prior art.

More particularly, it is an object of the present invention to provide a method of testing reflecting surfaces, especially relatively complex ones such as those of grazing hyperboloids, for surface accuracy, which method does not possess the disadvantages of the known methods of this type.

It is yet another object of the present invention to devise a method of the above kind which would make it possible to improve the accuracy and determinateness of the indication of any imperfections of the surface being tested.

A concomitant object of the present invention is to develop an arrangement which is particularly suited for the performance of the above method.

Still another object of the present invention is to design the arrangement of the type here under consideration in such a manner as to be able to eliminate the influence on the final testing results of any aberrations that are not those of the surface being tested.

An additional object of the present invention is so to construct the arrangement of the above type as to be relatively simple in construction, inexpensive to manufacture, easy to use, and reliable in operation.

DISCLOSURE OF THE INVENTION

In keeping with these objects and others which will become apparent hereafter, one feature of the present invention resides in an arrangement for testing a reflecting surface of a solid body, especially a relatively complex reflecting surface such as that of a grazing hyperboloid, for deviations of its actual shape from its ideal shape. This arrangement includes means for emitting a laser beam and optical means interposed between the emitting means and the reflecting surface to be tested. The optical means is operative for optically modifying the laser beam in such a manner as to propagate between the optical means and the reflecting surface along a predetermined path that is substantially normal to the reflecting surface and to be reflected from the reflecting surface for propagation substantially along the predetermined path and through the optical means back toward the emitting means as a return laser beam having a wave front indicative of the actual shape of the reflecting surface and any optical aberrations of the optical means. The arrangement further comprises means for forming an interference pattern between the original and return laser beams, and means for evaluating the interference pattern. The evaluating means of the invention includes means for generating an initial signal representative of the interference pattern, means for providing a reference signal representative of the ideal shape of the reflecting surface, means for storing an additional signal representative of the influence of the aberrations of the optical means on the interference pattern, and means for correlatedly subtracting the reference signal and the additional reference signal from the initial signal to obtain a final signal representative only of the difference between the actual and ideal shapes of the reflecting surface.

The present invention is further directed to a method of testing a reflecting surface of a solid body, especially a relatively complex reflecting surface such as that of a grazing hyperboloid, for deviations of its actual shape from its ideal shape, this method including the steps of emitting a laser beam, optically modifying the laser beam by at least one optical element so as to propagate toward the reflecting surface along a predetermined path that is substantially normal to the reflecting surface and to be reflected from the reflecting surface for return propagation substantially along the predetermined path and again through the optical element as a return laser beam having a wave front indicative of the actual shape of the reflecting surface and any optical aberrations of the optical element, forming an interference pattern between the laser beams, and evaluating the interference pattern. The evaluating step of the method of the present invention includes generating an initial signal representative of the interference pattern, providing a reference signal representative of the ideal shape of the reflecting surface, storing an additional signal representative of the influence of the aberrations of the optical element on the interference pattern, and correlatedly subtracting the reference signal and the additional reference signal from the initial signal to obtain a final signal representative only of the difference between the actual and ideal shapes of the reflecting surface.

BRIEF DESCRIPTION OF THE DRAWING

The foregoing and other objects, advantages and features of the present invention will become more readily apparent from the following detailed description when read in conjunction with the accompanying drawing in which.

BEST MODE FOR CARRYING OUT THE INVENTION

Figure 1:
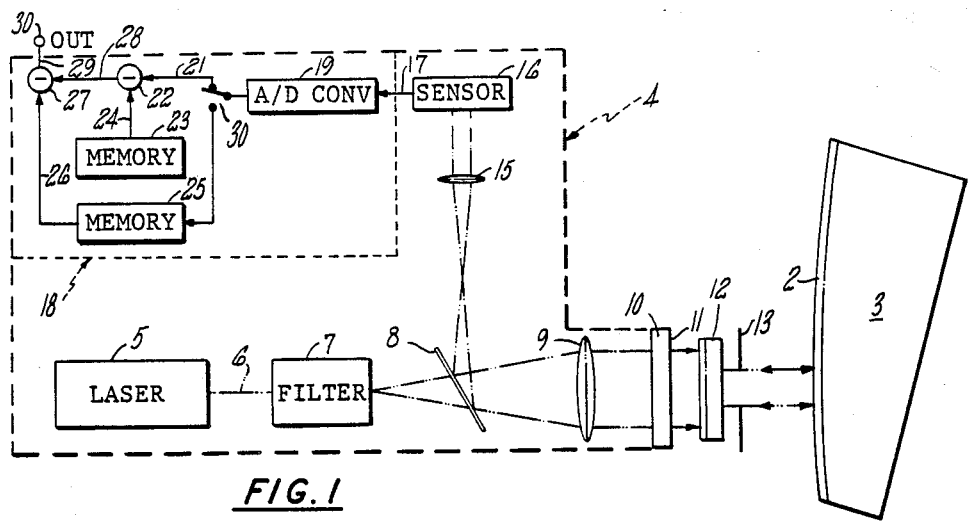
FIG. 1 is a top plan view of a testing arrangement of the present invention as used for testing the shape accuracy of a reflecting surface of a grazing hyperboloid.

Referring now to the drawing in detail, and first to FIG. 1 thereof, it may be seen that the reference numeral 1 has been used therein to identify a testing arrangement which has been constructed in accordance with the principles of the present invention for testing reflecting surfaces for deviations of their actual shapes from their ideal or desired shapes. The testing arrangement 1 is especially suitable, and is shown as being used, for testing an active reflecting surface 2 of a grazing hyperboloid 3 which is particularly suited for use in free electron laser resonators and which will be occasionally referred to herein merely as a grazer. The configuration and utility of the grazer 3 are well known to those active in the laser field, so that they will not be elaborated on here to any greater extent than that necessary for understanding the present invention.

Figure 2:
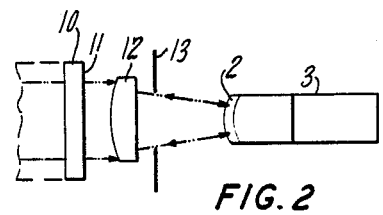
FIG. 2 is a side elevational view of a portion of the arrangement of FIG. 1 during its aforementioned use.

As a comparison of FIGS. 1 and 2 will reveal, the ideal shape of the reflecting surface 2 of the grazer 3 is that of a part of a surface of revolution having a hyperbola as its generatrix and a circle as its directrix; in other words, the reflecting surface 2 follows a part of a hyperbola in each axial section and a part of a circle in each cross section. In reality, the actual shape of the reflecting surface 2, while still in a substantial agreement with this ideal shape, will radially deviate therefrom to a greater or lesser degree at various locations, usually gradually. The magnitude of these radial deviations may vary either in the axial direction of the grazer 3, or in its transverse direction, or in both of these directions at the same time, so that the reflecting surface 2 will exhibit, with respect to the desired or ideal shape thereof, depressions or protuberances which may have rather complex spatial shapes. It will be appreciated that the presence of such deviations, if permitted to remain, would result in inferior quality of the reflecting surface 2, and especially would bring about variations in the angles of incidence and reflection of laser rays reaching different areas of the reflecting surface 2 during the ultimate use of the grazer 3, thus resulting in deterioration in the performance of the grazer 3 during such use. Therefore, such deviations must be removed, to the greatest extent possible, in a material-removing operation following the testing operation.

In order to be able to successfully perform this corrective material-removing operation on the reflecting surface 2 of the grazer 3, it is necessary to determine the precise location, extent and configuration of any one of the aforementioned protuberances or depressions. In accordance with the present invention, this is achieved by using an interferometric approach. This approach involves the use of an interferometer 4 which may be of any known construction. However, in the arrangement illustrated in FIGS. 1 and 2 of the drawing, the interferometer 4 is constructed as a Fizeau-type interferometer that is of a well known construction, such as that currently available on the market under the designation ZYGO Mark III phase measuring interferometer, and hence is depicted in the drawing only in a somewhat simplified fashion and will be described herein only to the extent needed for understanding the invention.

The Fizeau-type interferometer 4 includes as one of its main components a laser 5 which issues a laser beam 6 from one of its ends. After its issuance, the laser beam 5 passes through a spatial filter device 7 and is filtered thereby, and then propagates through a beam splitter 8 to a collimating lens 9 where it is collimated and directed through a reference plate 10 having a reference surface 11 toward a lens 12 and through the same and a subsequently arranged aperture mask 13 onto the reflective surface 2 of the grazer 3. As will be apparent from a comparison of FIGS. 1 and 2, the lens 12 is cylindrical and has a positive power, so that the laser beam 5 is focussed thereby toward a focal line which is situated beyond the reflecting surface 2 as considered in the direction of propagation of the laser beam 5, so that the laser beam 5 as optically modified during its passage through the lens 12 reaches the reflecting surface 2 substantially at a normal incidence thereto. The aperture mask 13 has an aperture 14 which delimits the region of the reflecting surface 2 that is illuminated by the optically modified laser beam 5 during any given phase of the testing operation.

After reaching the reflecting surface 2 to be tested, the optically modified laser beam 5 is reflected by the reflecting surface 2 for propagation back toward and beyond the aperture mask 13 which usually eliminates some undesirable stray light from the return laser beam. The lens 12 then substantially recollimates the return laser beam, and this recollimated laser light then propagates back to the reference surface 11 of the reference plate 10, where it is combined with a portion of the original laser beam 5 that is reflected back from the reference surface 11. The combined laser light beam then proceeds to the beam splitter 8 which reflects a portion of this combined beam to another collimating lens 15 and through the same toward a sensor 16 which senses the interference pattern resulting from the combination of the return laser light beam with the original laser light beam.

In accordance with the present invention, the sensor 16 is constructed in such a manner, for instance by being constituted by or including a TV camera, as to be able to generate an electrical signal that is representative of the fringe pattern of any interferogram sensed by the sensor 16 and thus of the wave front of the respective return laser beam. This electrical signal is then supplied through an electric conductor 17 to an evaluating circuitry 18 which either may be incorporated in the interferometer 4 or may be separate therefrom. In the depicted construction of the evaluating circuitry 18, the electrical signal appearing at the electric conductor 17 is fed to an input of an A/D converter 19 which is of any known construction and which digitizes the electrical signal received thereby from the sensor 16. The digitized electrical signal is then supplied through an externally controlled switch 20, when the latter is in its illustrated position, and through an electrical conductor 21 to a first subtracting device 22 of any known construction, where the contents of a first memory 23 as supplied to the first subtracting device 22 by an electrical conductor 24 is subtracted from the digitized electrical output signal of the A/D converter 19. The first memory 23 stores a first reference signal which is a digital version of an electrical signal representative of an ideal interferogram, that is, an interferogram which would be obtained at the sensor 16 if the shape of the reflecting surface 2 were ideal and if the lens 12 did not have any aberrations. Inasmuch as it is difficult if not impossible to satisfy these conditions, the digital first reference signal for the respective portion of the reflecting surface 2 is advantageously calculated in advance and stored in the first memory 23.

The evaluating circuitry 18 further includes a second memory 25 for storing a digital second reference signal that is representative of an interferogram which would result from taking into account only the aberrations of the lens 12 and their influence on the wave front of the return laser beam. The second reference signal may be obtained in the manner which will be discussed in some detail later or by using any known technique for detecting cylindrical lens aberrations; however, for the time being, it will be assumed that the value of this second reference signal is known. The second reference signal is supplied through an electrical conductor 26 to one input of a second subtracting device 27, while the output signal of the first subtracting device 22 is supplied through another electric conductor 27 to another input of the second subtracting device 28 which then subtracts the digital second reference signal from the digital output signal of the first subtracting device 22, whereupon the resulting digital signal appears at an electrical conductor 29 that is connected to the output of the second subtracting device 27 and leads to an output 30 of the evaluating circuitry 18.

The digital output signal of the second subtracting device 27 is then advantageously supplied from the output 30 to a non-illustrated computer, where it may be processed, for instance, by utilizing the known WISP fringe analysis code, and eventually displayed, for instance, printed out in the form of a three-dimensional map, such as those depicted in FIGS. 3a to 3e of the drawing. FIGS. 3a, 3b, 3c, 3d and 3e show maps of the digital signals which appear during the performance of a testing operation on a selected section of the reflective surface 2 of a particular grazing hyperboloid 3 in the electrical conductors 21, 24, 28, 26 and 29, in that order. It will be appreciated that such signals are representative of interference patterns corresponding to the actual testing result on the aforementioned reflecting surface section as influenced by the lens aberrations (the signal appearing in the electrical conductor 21), to an associated ideal testing result for the same reflecting surface section without any lens aberration influence (the contents of the memory 23), to the subtraction of the electrical signals represented of FIGS. 3a and 3b (the signal appearing in the electrical conductor 28), to the lens aberration influence (the contents of the memory 25), and to the subtraction of the electrical signals represented in FIGS. 3c and 3d (the signal appearing in the electrical conductor 29 and at the output 30), respectively. The maps of FIGS. 3a to 3d have been obtained by selectively suspending the supply of the first and second reference signals, of the output signal of the A/D converter 19 and the second reference signal, of the second reference signal, and of the output signal of the A/D converter 19 and the first reference signal, respectively, to the respective subtracting devices 22 and 27, in any manner that is well known to those active in this field.

Figure 3A:
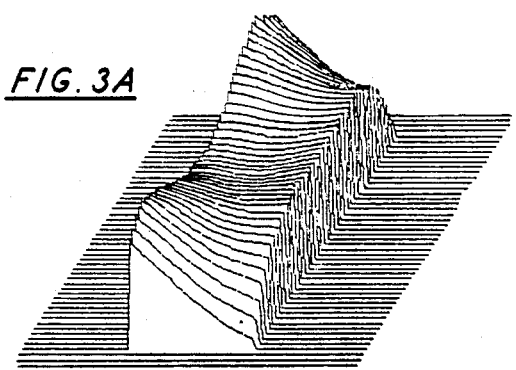
FIGS. 3a to 3e are graphic representations of three-dimensional maps of various electrical signals representative of interferograms obtained or used in the testing arrangement of FIGS. 1 and 2.
Figure 3D:
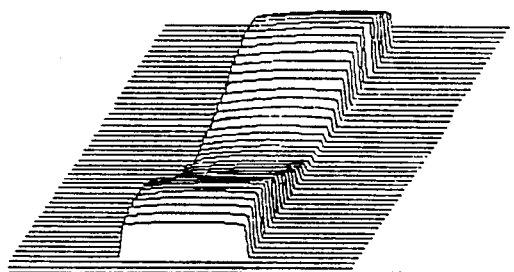
Figure 3B:
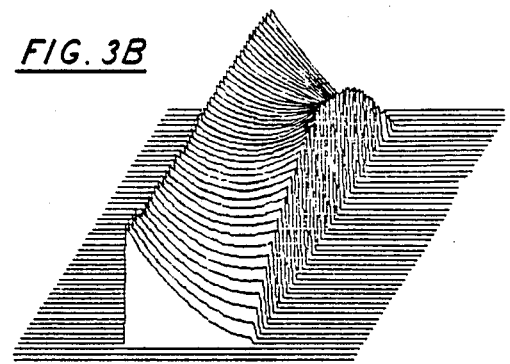
Figure 3E:
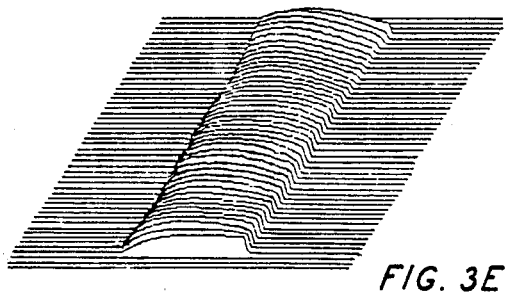
Figure 3C:
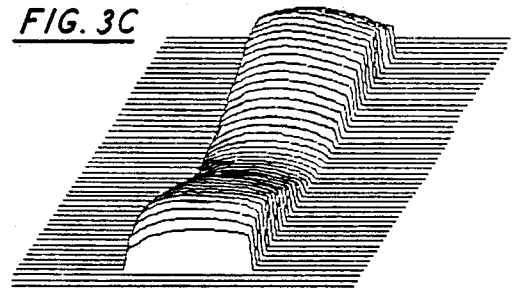

It may be seen from the above explanation that the normal incidence procedure of the present invention as used for testing grazers involves comparison of small sections of the hyperboloid high power region to a best fit cylindrical wave front which is produced by the lens 12. A real interferogram of the section of the surface being tested is mapped in FIG. 3a, while an ideal interferogram of the same section (which would be obtained if both the lens 12 and the surface 2 were ideal) is mapped in FIG. 3b. FIG. 3c then shows the mapped result of subtraction of the maps of FIGS. 3a and 3b. However, it is to be realized that buried in the real data are the effects of the cylindrical lens 12 used in the test configuration. It is possible and contemplated by the present invention to test the lens 12, for instance by using the approach which will be addressed below. The resultant interferogram is also digitized and stored in the memory 25 and has been depicted in a map form in FIG. 3d. This lens information is then subtracted from the map of FIG. 3c to obtain the final result that is mapped in FIG. 3e and that conveys the information about the deviations of the actual shape of the surface section being tested from the ideal or desired shape of the same section. This final information can then be used for making the necessary corrections.

It is interesting to note how the effect of the lens 12 becomes readily apparent after the first subtraction, as shown in FIG. 3c. The residual surface map of FIG. 3e shows an almost cylindrical shape with a three-wave peak-valley configuration. This represents the surface error in the configuration of the hyperboloid 3 at the particular sub-aperture tested.

Aside from rendering it possible to obtain residual optical path difference maps of each sub-aperture or section of the reflective surface 2 of the grazer 3, with their peak-valley and root mean square parameters, the technique of the present invention can also be used for splicing the thus obtained maps (corresponding to FIG. 3e) for the adjacent sections of the surface 2 to give an overall optical path difference map of the entire high power region of the surface 2. This provides a distinct advantage to the optician when polishing the surface 2 to its final configuration, since it provides an indication of the actual configuration of the surface 2 prior to the final polishing step and the extent to which corrections are to be made at the various areas of the surface 2.

The use of normal incidence testing for free electron laser grazers by comparing the hyperboloid surface 2 to a best fit cylindrical wave front represents a substantial improvement over the known approaches. This technique dramatically assists in the grazer fabrication process by providing for the first time reliable data on surface configuration errors.

As mentioned before, the memory 25 contains information about the influence of the aberrations of the cylindrical lens 12 on the interferogram detected by the sensor 16. A technique for obtaining this information and storing it in the memory 25 will now be explained with reference to FIGS. 4 and 5 of the drawing. As shown there, an optical fiber or a similar filament 31 is positioned at and along the focal line of the lens 12. Thus, the laser beam 6 emerging from the interferometer 4 passes through the cylindrical lens 12 and is focused thereby into a waist region 32 extending along the focal line of the lens 12, and the filament 31 is at least coextensive with the waist region 32, so that a portion of the laser light reaching the filament 31 is reflected back to the lens 12 and is substantially recollimated thereby prior to reaching the reference surface 11 of the reference plate 10 of the interferometer 4.

It is particularly advantageous to use an optical fiber having a reflective outer surface or coating as the filament 31, inasmuch as in modern optical fibers which are finding an ever increasing role in the communications industry and elsewhere, one parameter affecting the performance of the optical fiber is cross-sectional stability (diameter) of the fiber as a function of length, so that the cross-sectional configuration of the optical fiber must be held within very tight limits during the fiber drawing process since otherwise the optical losses of the optical fiber during its use for transmitting light in its longitudinal direction could be quite dramatic. The drawing process, during which the fiber is being drawn from an optical preform at a rate of several meters per second, is a flow process, so that it is highly unlikely that the diameter of the fiber would vary significantly over sub-meter lengths. It is, therefore, possible to use the external surface of the fiber (the cladding surface) as a reasonably accurate cylindrical reference surface in the interferometric arrangement described above where the optical fiber 31 is placed coincidently with the focal line of the cylindrical lens 12.

The optical fiber as it is supplied by the manufacturer is enclosed in a plastic jacket. This protective coating is acquired during the drawing process, and it is normally not expected to be removed when the fiber is to be used as an optical waveguide (except for short sections during splicing). For use in the testing arrangement of FIGS. 4 and 5, however, 10 to 15 inches of the plastic coating material are removed from the fiber with a special tool which leaves the underlying glass material undamaged. The bare fiber is then strung across a special fixture to deposit a thin film reflective coating thereon. The coating must be uniform; therefore, the fixture rotates the fiber about its longitudinal axis during the formation of the coating. The coated fiber is then stretched across a special mount which allows one axis of tilt plus in-plane rotation (for clocking purposes). The fiber ends are epoxied in place. One end of the fiber is attached to a spring mount through which an adjustable tension is applied to the fiber. The fiber must be used under tension to avoid bowing which would adversely affect the quality of the cylindrical lens test interferometry.

Figure 4:
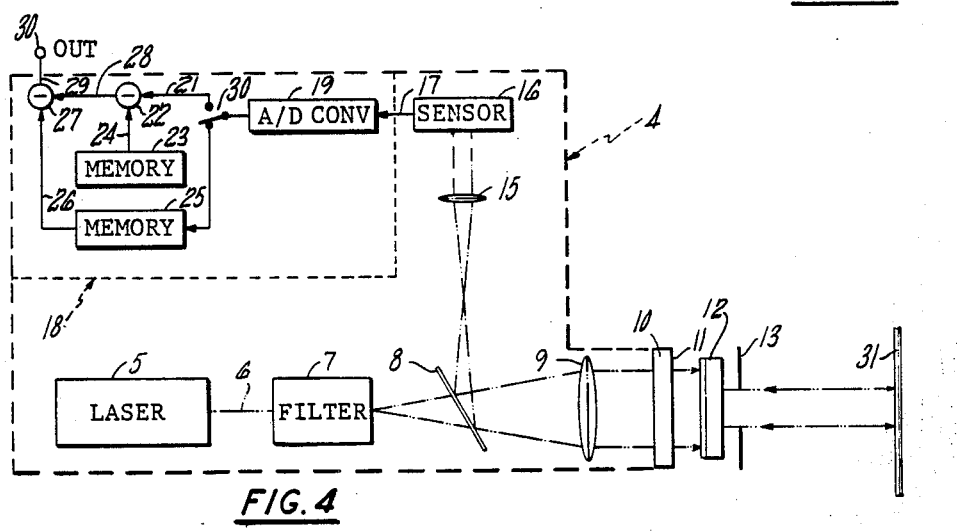
FIG. 4 is a view similar to FIG. 1 but showing the testing arrangement as used in determining aberrations of a cylindrical lens of the testing arrangement prior to the performance of the actual testing operation on the grazing hyperboloid.
Figure 5:
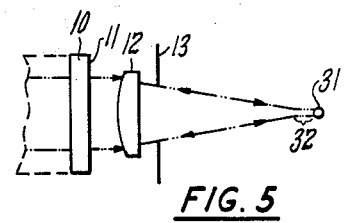
FIG. 5 is a view similar to FIG. 2 but of the testing arrangement as used in FIG. 4.

The laser light reflected from the optical fiber or similar filament 31 in the arrangement of FIG. 4 has a substantially cylindrical wave front. This is so because the filament 12 acts as a filter for the effects of any aberrations of the lens 12 on the wave front shape of the laser beam 6 propagating toward the filament 31, due to the fact that the filament 31 is located at the diffracting rather than geometric focus of the lens 12 and thus only a rather minute area of the reflective surface of the filament 31 reflects light back to the lens 12. This means that any disturbances of the wave front of the forwardly propagating laser beam will have only negligible effects, if any, on the shape of the wave front of the reflected laser beam, so that the wave front of the return laser beam will be substantially or exactly cylindrical before reaching the lens 12. Then, the lens 12 will convert the cylindrical wave front into a substantially planar one, but any optical aberrations of the lens 12 will result in deviations from the ideal planar wave front shape, so that the interference of the thus disturbed wave front at the reference surface 11 of the reference plate 10 with the original laser light beam 6 will result in an interferogram which is indicative of the type, size and distribution of the optical aberrations of the lens 12.

This interferogram is then sensed by the sensor 16 (see FIG. 4) and the resulting electrical signal is supplied through the electric conductor 17 to the A/D converter 19 where it is digitized. At this time, the switch 20 is temporarily switched over into its position illustrated in FIG. 4, so that the output signal of the A/D converter 19 is supplied through an electric conductor 33 to an input of the memory 25. In this manner, the digitized form of the output signal of the sensor 16 is stored in the memory 25 for subsequent use during the operation of the testing arrangement in its mode depicted in FIGS. 1 and 2 of the drawing.

It should be understood that the invention is not limited to the particular embodiment shown and described herein, but that various changes and modifications may be made without departing from the spirit and scope of this concept as defined by the following claims.

I claim:

1. An arrangement for testing an aspheric convex grazing reflecting surface of a solid body, which is to be impinged upon during its use by a light beam at a grazing angle of incidence deviating from normal to the reflecting surface, for deviations of its actual shape from its ideal shape, comprising:

means for emitting a laser beam;

optical means including an optically active surface with a shape dissimilar from that of the reflecting surface to be tested interposed between said emitting means and the reflecting surface to be tested and operative for so optically modifying said laser beam as to propagate between said optical means and the reflecting surface along a predetermined path that is substantially normal to the reflecting surface and to be reflected from the reflecting surface for propagation substantially along said predetermined path and through said optical means back toward the generating means as a return laser beam having a wave front indicative of the actual shape of the reflecting surface and any optical aberrations of said optical means;

means for forming an interference pattern between said laser beams; and means for evaluating said interference pattern, including means for generating an initial signal representative of said interference pattern, means for providing a reference signal representative of the ideal shape of the reflecting surface, means for storing an additional signal representative of the influence of the aberrations of said optical means on the interference pattern, and means for correlatedly subtracting said reference signal and said additional reference signal from said initial signal to obtain a final signal representative only of the difference between the actual and ideal shapes of the reflecting surface.

2. The arrangement as defined in claim 1, wherein said optical means includes at least one lens.

3. The arrangement as defined in claim 2, wherein said lens is a cylindrical lens having a focal line.

4. The arrangement as defined in claim 3 for use in applications in which the reflecting surface is convex at least in one direction, wherein said focal line of said cylindrical lens is at least substantially normal to said one direction and is situated behind said reflecting surface as considered in the direction of propagation of the laser beam toward the reflecting surface for said lens to concentrate said laser beam during its approach of the reflecting surface and to substantially recollimate the return laser beam reflected from the reflecting surface.

5. The arrangement as defined in claim 1 for use in applications in which the reflecting surface is convex at least in one direction, wherein said optical means is operative for focusing said laser beam toward a focal line which is at least substantially normal to said one direction and is situated behind the reflecting surface as considered in the direction of propagation of the laser beam toward the reflecting surface for said optical means to concentrate said laser beam during its approach of the reflecting surface and to substantially recollimate the return laser beam reflected from the reflecting surface.

6. The arrangement as defined in claim 5, further comprising means for examining said optical means prior to the installation of the solid body in the arrangement to form said additional reference signal for storage in said storing means, including a filament having a cylindrical reflective surface centered on said focal line of said optical means for said wave front of said return laser beam to be indicative of any optical aberrations of said optical means and for said initial signal generated by said generating means to be representative of such aberrations for use in the formation of said additional reference signal.

7. The arrangement as defined in claim 6, wherein said filament is an optical fiber having an outer reflective coating forming said reflective surface.

8. A method of testing an aspheric convex grazing reflecting surface of a solid body, which is to be impinged upon during its use by a light beam at a grazing angle of incidence deviating from normal to the reflecting surface, for deviations of its actual shape from its deal shape, comprising the steps of:

emitting a laser beam;

optically modifying said laser beam by at least one optical element having an optically active surface with a shape dissimilar from that of the reflecting surface to be tested so as to propagate toward the reflecting surface along a predetermined path that is substantially normal to the reflecting surface and to be reflected from the reflecting surface for return propagation substantially along the predetermined path and again through the optical element as a return laser beam having a wave front indicative of the actual shape of the reflecting surface and any optical aberrations of the optical element;

forming an interference pattern between the laser beams; and evaluating the interference pattern, including generating an initial signal representative of the interference pattern, providing a reference signal representative of the ideal shape of the reflecting surface, storing an additional signal representative of the influence of the aberrations of the optical element on the interference pattern, and correlatedly subtracting the reference signal and the additional reference signal from the initial signal to obtain a final signal representative only of the difference between the actual and ideal shapes of the reflecting surface.

9. The method as defined in claim 8 for use in applications in which the reflecting surface is convex at least in one direction and the optical element is operative for focusing collimated light toward a focal line, further comprising the step of so positioning the optical element with respect to the reflecting surface that the focal line is at least substantially normal to the one direction and is situated behind the reflecting surface as considered in the direction of propagation of the laser beam toward the reflecting surface for the optical element to concentrate the laser beam during its approach of the reflecting surface and to substantially recollimate the return laser beam reflected from the reflecting surface.

10. The method as defined in claim 9, further comprising the step of examining the optical element in the absence of the solid body to form the additional reference signal for use in said storing step, including so situating a filament having a cylindrical reflective surface that the latter is centered on the focal line of the optical element for the wave front of the return laser beam to be indicative of any optical aberrations of the optical element and for the initial signal to be representative of such aberrations for use in the formation of the additional reference signal.

* * * * *

UNITED STATES PATENT AND TRADEMARK OFFICE
CERTIFICATE OF CORRECTION

PATENT NO. : 4,917,498

DATED : April 17, 1990

INVENTOR(S) : Joseph M. Geary

It is certified that error appears in the above-identified patent and that said Letters Patent is hereby corrected as shown below:

Title page: Item --(73) Assignee: United Technologies Corporation,

Hartford, Conn.-- should be inserted

Claim 8, Column 10, Line 6  "deal" should be --ideal--

Signed and Sealed this

Tenth Day of March, 1992

Attest:

HARRY F. MANBECK, JR.

*Attesting Officer*      *Commissioner of Patents and Trademarks*